United States Patent [19]
Yokota

[11] Patent Number: 4,764,001
[45] Date of Patent: Aug. 16, 1988

[54] RETROFOCUS-TYPE OBJECTIVE FOR AN ENDOSCOPE

[75] Inventor: Akira Yokota, Tokyo, Japan

[73] Assignee: Olympus Optical Co., Ltd., Tokyo, Japan

[21] Appl. No.: 127,256

[22] Filed: Dec. 1, 1987

Related U.S. Application Data
[63] Continuation of Ser. No. 743,356, Jun. 10, 1985.

[30] Foreign Application Priority Data

Jun. 13, 1984 [JP] Japan ............................... 59-119936

[51] Int. Cl.$^4$ ............................................... G02B 9/60
[52] U.S. Cl. .................................... 350/465; 350/462
[58] Field of Search ............. 350/462, 465, 450, 96.26

[56] References Cited

U.S. PATENT DOCUMENTS 4,403,837 9/1983 Nakahashi .......................... 350/465

*Primary Examiner*—John K. Corbin
*Assistant Examiner*—P. M. Dzierzynski
*Attorney, Agent, or Firm*—Cushman, Darby & Cushman

[57] ABSTRACT

A retrofocus-type objective for an endoscope which comprises a first lens component comprising a negative lens, a stop, a second lens component comprising a positive meniscus lens, a third lens component comprising a positive lens, a fourth lens component comprising a cemented doublet which consists of a positive lens and a negative lens, and a fifth lens component comprising positive lens, the retrofocus-type objective for an endoscope being arranged to be focused by advancing the third and fourth lens components.

5 Claims, 7 Drawing Sheets

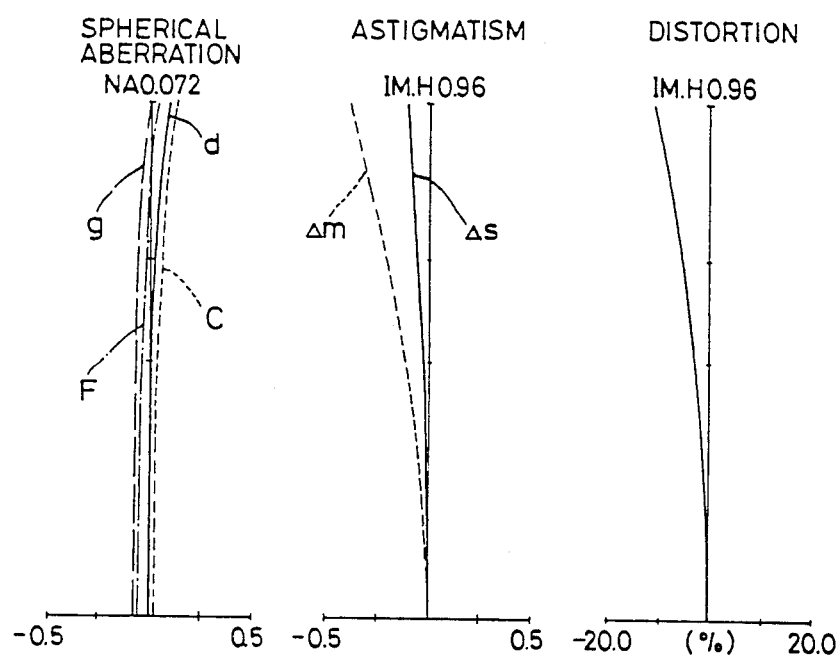
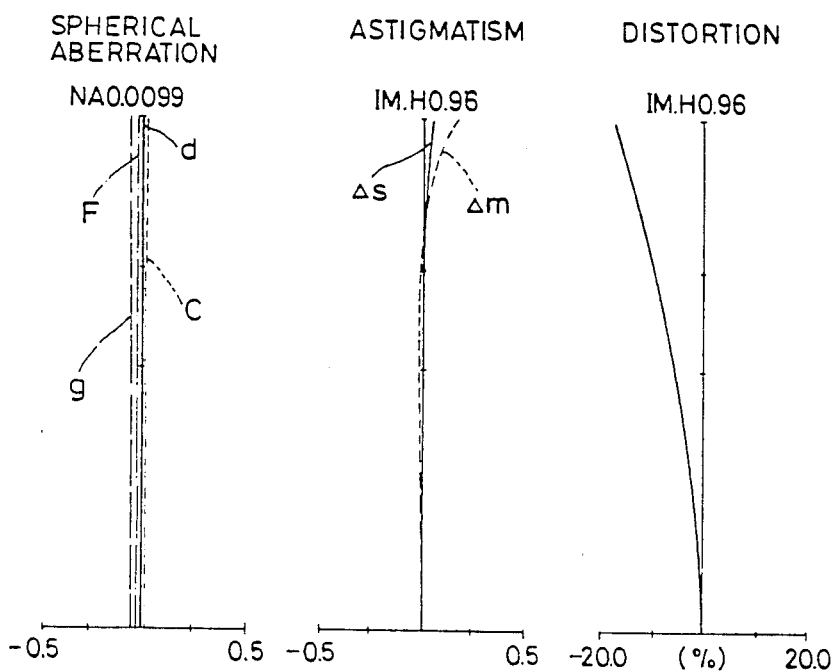

RETROFOCUS-TYPE OBJECTIVE FOR AN ENDOSCOPE

This is a continuation of application Ser. No. 743,356, filed June 10, 1985.

BACKGROUND OF THE INVENTION (a) Field of the Invention

The present invention relates to a retrofocus-type objective for an endoscope and, more particularly, to a retrofocus-type objective for an endoscope of which aberrations are corrected favourably in all of the states that said objective is focused, i.e., the state focused on an object at a short distance, state focused on an object at a long distance, and respective states of focusing on objects at intermediate distance.

(b) Description of the Prior Art

An endoscope should have such overall structure that liquid will not enter the inside thereof. Therefore, an object for an endoscope is so arranged that the front lens thereof serves also as a cover glass. This means that, for an object for an endoscope, it is impossible to adopt the focusing method to advance the lens system as a whole or focusing method to advance the front lens through those focusing methods are widely adopted for lens systems in general. As a method devised in order to solve the above-mentioned problem, there is a known focusing method to keep the front lens group fixed and to move the rear lens group.

An objective for an endoscope disclosed in U.S. Pat. No. 4,059,344 is known as an objective for which the above-mentioned focusing method is adopted. Said known objective is designed as a retrofocus-type objective which comprises a front lens group comprising a diverging lens $L_1$, and a rear lens group comprising converging lenses $L_2$, $L_3$ and $L_4$, and which is arranged to be focused by moving the lens $L_2$ along the optical axis, said known objective being suitable for the use with a device which constructed so that liquid will not enter the inside.

However, said known objective has disadvantages as explained below. That is, though aberrations thereof are corrected favourably when said known objective is focused on an object at a long distance, it is difficult to say that aberrations when focused on an object at a short distance are corrected satisfactorily favourably, i.e., astigmatism is undercorrected. Therefore, the resolving power in the marginal portion is not satisfactory.

Besides, in recent years, it is strongly desired to observe an object by enlarging it as far as possible at the time of observation by an endoscope. Therefore, also in the field of objectives for endoscopes, there is an increasing demand for a lens system which can be focused on an object at the infinite distance up to an object at an extremely short distance that corresponds to the object distance at the time of photographing by a camera using a macro lens. From the above-mentioned view point, the known objective according to the afore-mentioned patent has a disadvantage that it cannot be focused on an object at an extremely short distance at which the object can be observed with a satisfactorily high magnification.

SUMMARY OF THE INVENTION

It is, therefore, a primary object of the present invention to provide a retrofocus type objective for an endoscope of which aberrations are corrected favourably in well balanced state for both cases that the objective is focused on an object at a long distance and that the objective is focused on an object at an extremely short distance, and which makes it possible to obtain a satisfactorily high magnification for observation.

The objective according to the present invention has a lens configuration as shown in FIG. 1. That is, the objective according to the present invention comprises, in the order from the object side, a first lens component comprising a negative lens, a stop, a second lens component comprising a positive meniscus lens which is concave toward the object side, a third lens component comprising a positive lens, a fourth lens component comprising a positive lens and a negative lens, and a fifth lens component comprising a positive lens. Besides, the objective according to the present invention is arranged to be focused by advancing the third and fourth lens components and, moreover, arranged to fulfill the conditions (1) and (2) shown below:

$$-0.9 < f_1/f_a \quad (1)$$

$$1.0 < f_2/f_a < 1.3 \quad (2)$$

where, reference symbol $f_1$ represents the focal length of the first lens component, reference symbol $f_2$ represents the total focal length of the second through the fifth lens components, and reference symbol $f_a$ represents the focal length of the lens system as a whole when focused on an object at a short distance.

Generally, retrofocus-type objectives have such tendency that astigmatism becomes considerably undercorrected as the object point approaches the lens system and, as a result, the image surface inclines toward the "minus" side. Therefore, when it is desired to focus the lens system on an object at a short distance, it is important to correct the above-mentioned inclination of image surface. Especially in case of objectives for endoscopes, correction of image surface is difficult because the field angle is generally large.

On the other hand, to arrange that a satisfactorily high magnification can be obtained when the lens system is focused on an object at a short distance, the distance l from the front focal point of the lens system as a whole to the object should be made satisfactorily small compared with the focal length $f_a$ of the lens system as a whole.

Besides, as an objective for an endoscope is to be arranged in a distal end of an endoscope with a small diameter, lens diameters whould be made small. Therefore, balance of heights of rays which pass through respective lens groups should be also taken into consideration.

Out of the above-mentioned requirements, the problem to prevent the image surface from inclining toward the "minus" side is extremely important in order to arrange that the marginal portion of image can be observed favourably. For this purpose, in case of the objective for an endoscope according to the present invention, Petzval's sum is corrected by controlling the power of the rear lens group thereof comprising the second through the fifth lens components and having positive refractive power.

The condition (2) is established for the above-mentioned purpose. If $f_2/f_a$ is made smaller than 1.0, Petzval's sum will be overcorrected. If, on the contrary, $f_2/f_a$ is made larger than 1.3, Petzval's sum will be undercorrected. In either case, it is impossible to obtain favourable quality of image. Besides, if $f_2/f_a$ is made smaller than 1.0 and power of the rear lens group becomes considerably strong, the heights of offaxial rays become high in the front lens groups thereof comprising the first lens component whihc is arranged as a negative lens. As a result, the diameter of the front lens becomes large, and this is not desirable.

To obtain a high magnification when the objective is focused on an objective at a short distance in the state that the focal length $f_2$ is selected in the range defined by the condition (2), it is necessary to fulfill the condition (1).

If $f_1/f_a$ is made smaller than the lower limit of the condition (1) and power of the front lens group becomes weak, the airspace between the front and rear lens groups should be made large in order to obtain the desired value of field angle. As a result, the distance between the object and front focal point of the lens system as a whole becomes long when the lens system is focused on an object at a short distance and, consequently, it is impossible to made the magnification high.

The objective which fulfills the conditions (1) and (2) shown in the above is capable of accomplishing the object of the present invention. However, when said objective is arranged that the airspace D between the first and second lens components fulfills the condition (3) shown below, it is possible to make the available focusing range satisfactorily wide when the objective is focused by means of the rear lens group, which is a positive lens group, and it is possible to make the magnification satisfactorily high when the objective is focused on an object at a short distance.

$$D/f_a < 0.7 \tag{3}$$

That is, when $D/f_a$ is made smaller than 0.7, the length of a system comprising the first lens component and the second lens component becomes short, and the heights of rays which go out from the second lens component become low. As a result, the space available for moving a focusing group, which comprises the third lens component and the fourth lens component, can be made large and it is possible to arrange that the objective can be focused up to an object at an extremely short distance. Moreover, as the heights of rays which enter the above-mentioned focusing group do not become so high, it is also possible to correct aberrations favourably and to make the variation of aberrations small.

By limiting the values of $f_1$ and $f_2$ in relation to the focal length of the lens system as a whole as described so far, it is possible to obtain an objective of which the enlarging magnification when observing an object at a short distance is satisfactorily high. Furthermore, by limiting the airspace D between the first and second lens components as described in the above, it is possible to obtain an objective with a satisfactorily wide focusing range.

Besides, to obtain favourable quality of image in both cases of observation, i.e., at the time of ordinary observation of an object at a long distance and at the time of observation of an object at a short distance by magnifying the object, it is preferable to arrange that the objective according to the present invention further fulfills the conditions (4), (5) and (6) shown below:

$$1.0 < r_1/f_a < 4.0 \tag{4}$$

$$-1.5 < r_4/f_a < -1.0 \tag{5}$$

-continued $$1.3 < R < 4.0 \tag{6}$$

$$1/R = 1/r_6 + 1/r_{10}$$

where, reference symbol $r_1$ represents the radius of curvature of the surface of the object side of the first lens component, reference symbol $r_4$ represents the radius of curvature of the surface on the object side of the second lens component, reference symbol $r_6$ represents the radius of curvature of the surface on the object side of the third lens component, and reference symbol $r_{10}$ represents the radius of curvature of the surface on the image side of the fourth lens component.

Generally, regarding the retrofocus-type lens systems which are arranged to be focused by advancing the positive lens group arranged as the rear lens group, it is known that, when aberrations to be caused at the time of ordinary observation of an object at a long distance are corrected favourably, aberrations at the time of observation of an object at a short distance comes to the state that astigmatism becomes a "minus" value with a large absolute value and, consequently, the resolving power decreases considerably. Besides, it is known that astigmatism is defined by the difference between the converging point of sagittal rays and converging point of meridional rays and that astigmatism to be caused becomes smaller when the shapes of respective surface of lenses becomes closer to the shapes concentric with the stop. The conditions (4) and (5) shown in the above are established by taking the above-mentioned point into consideration.

If, in the conditions (4) and (5), $r_1/f_1$ and/or $r_4/f_a$ is made smaller than the lower limit thereof, astigmatic difference will be overcorrected. If $r_1/f_a$ and/or $r_4/f_a$ is made larger than the upper limit thereof, astigmatic difference will be undercorrected.

The objective according to the present invention is arranged that the third lens component and the fourth lens component are movable. Therefore, when it is considered that the third and fourth lens components constitute a movable lens group, it is possible to correct astigmatic difference by limiting the radius of curvature $r_6$ of the foremost surface of said movable lens group and the radius of curvature $r_{10}$ of the rearmost surface of said movable lens group as defined by the condition (6).

If, in the condition (6), the value of R becomes smaller than the lower limit, i.e., 1.3, astigmatic difference will be undercorrected. If the value of R becomes larger than the upper limit, i.e., 4.0, astigmatic difference will be overcorrected.

As described so far, the objective according to the present invention is arranged that the absolute value of astigmatic difference, which is generally caused in the retrofocus-type objectives, is made small by means of the surface $r_1$ and surface $r_4$ in the front lens group by arranging that said surfaces fulfill the conditions (4) and (5). Besides, by limiting the values of $r_6$ and $r_{10}$ as defined by the condition (6), it is possible to correct astigmatic difference in well balanced state also in case that the objective is arranged to be focused by moving the lens components in the rear lens group.

BRIEF DESCRIPTION OF THE DRAWINGS

FIGS. 2 and 3 respectively show graphs illustrating aberration curves of Embodiment 1 of the present invention when the object distance is 14.2450 and 1.5385 respectively;

FIGS. 4 and 5 respectively show graphs illustrating aberration curves of Embodiment 2 of the present invention when the object distance is 14.2045 and 1.53609 respectively;

DETAILED DESCRIPTION OF THE PREFERRED EMBODIMENTS

Figure 1:
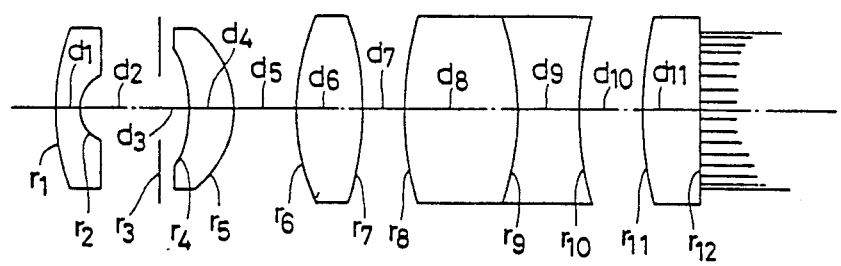
FIG. 1 shows a sectional view of the retrofocus-type objective for an endoscope according to the present invention.
Figure 2:
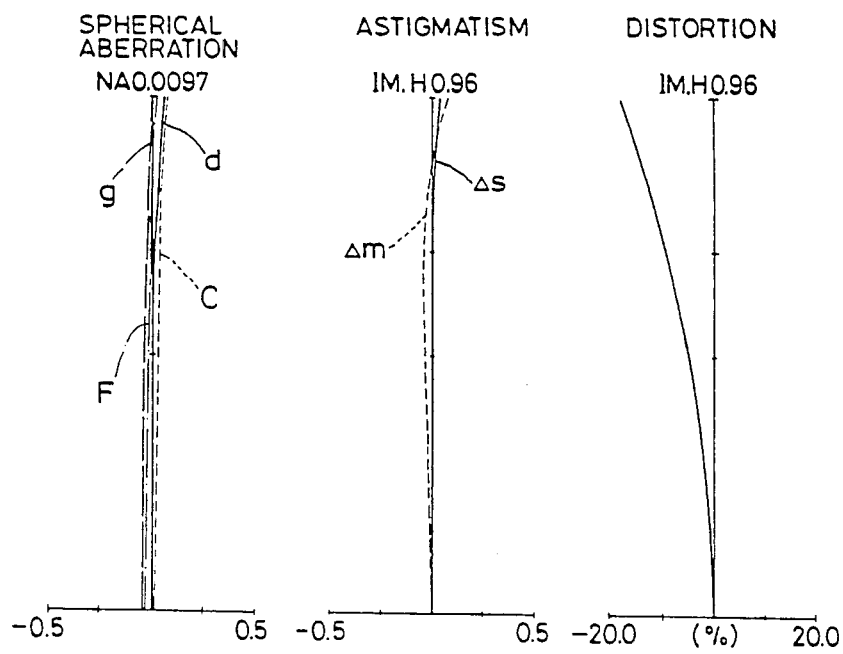
Figure 5:
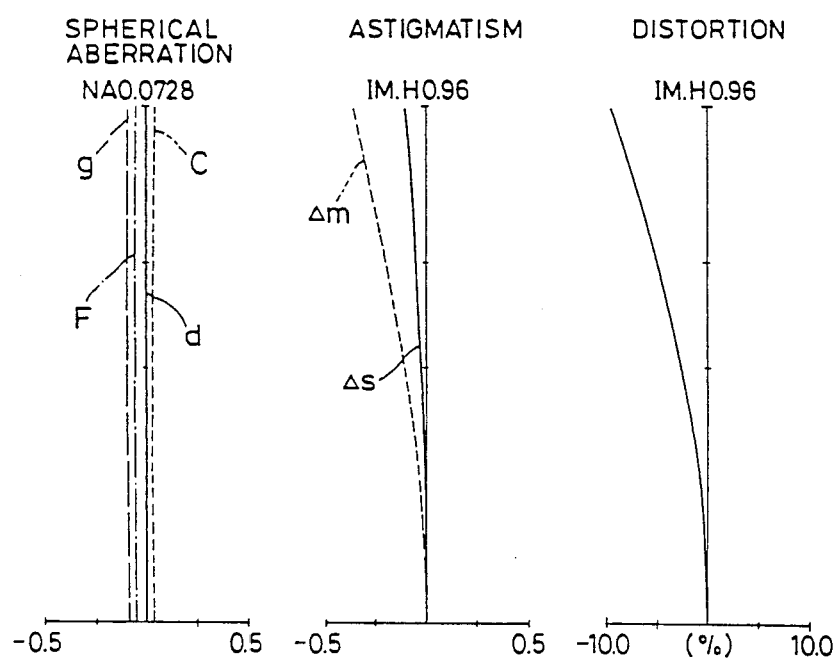
Figure 6:
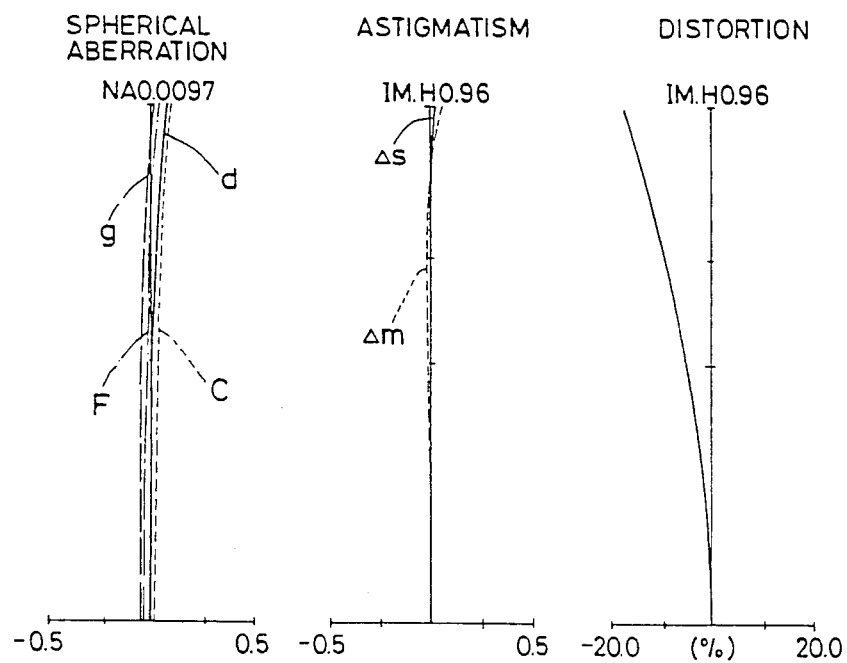
FIGS. 6 and 7 respectively show graphs illustrating aberration curves of Embodiment 3 of the present invention when the object distance is 14.2045 and 1.53409 respectively.
Figure 7:
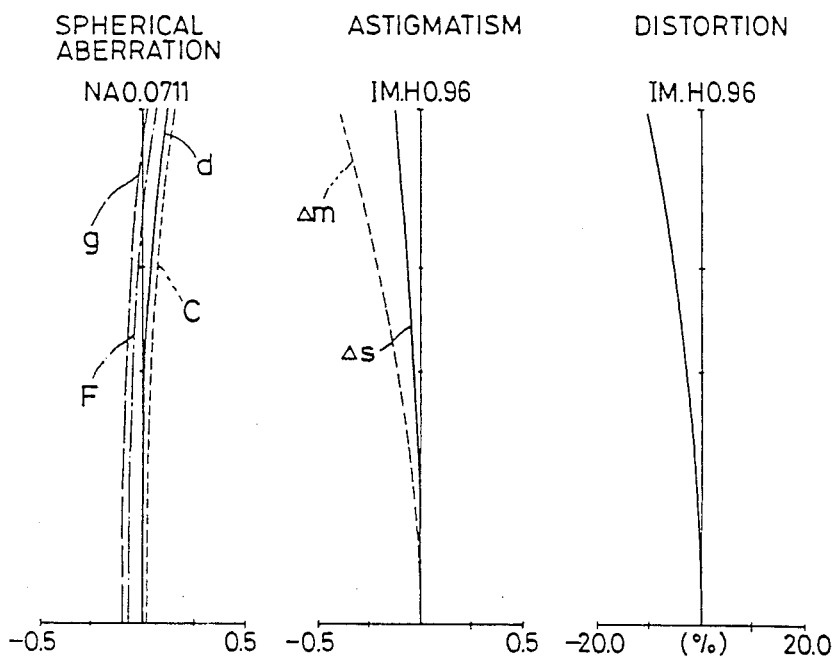
Figure 8:
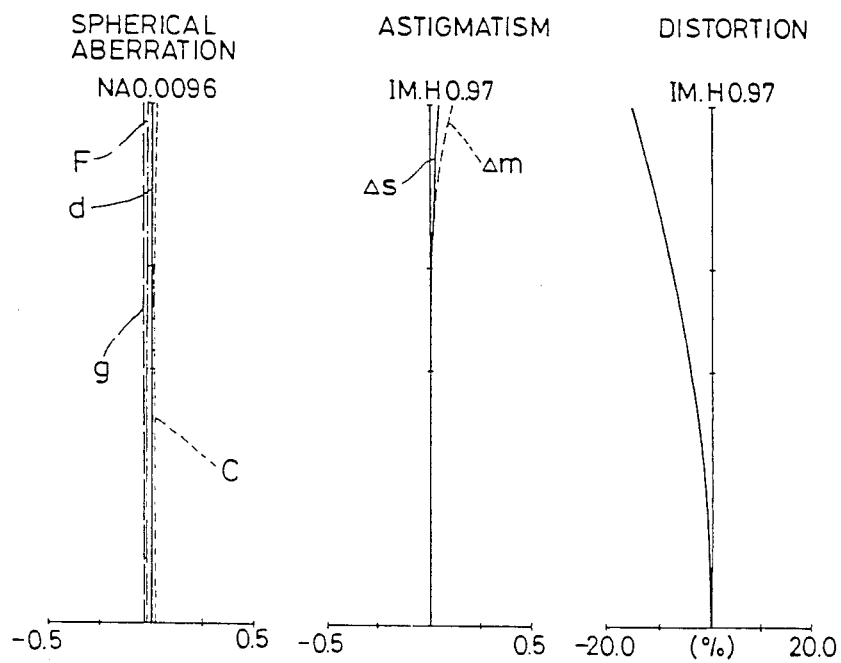
FIGS. 8 and 9 respectively show graphs illustrating aberration curves of Embodiment 4 of the present invention when the object distance is 14.27755 and 1.54198 respectively.
Figure 9:
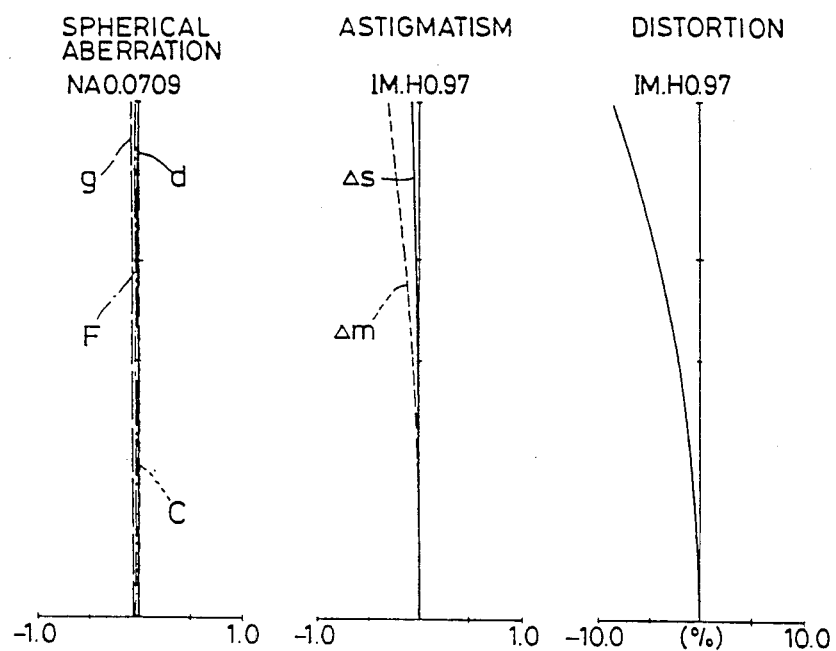
Figure 10:
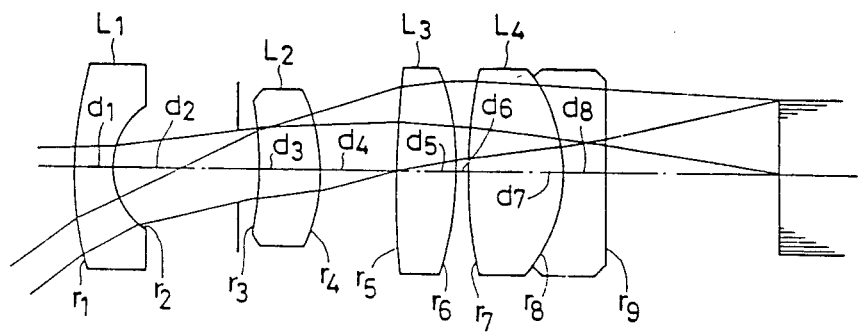
FIG. 10 shows a sectional view of a known objective for an endoscope.
Figure 11:
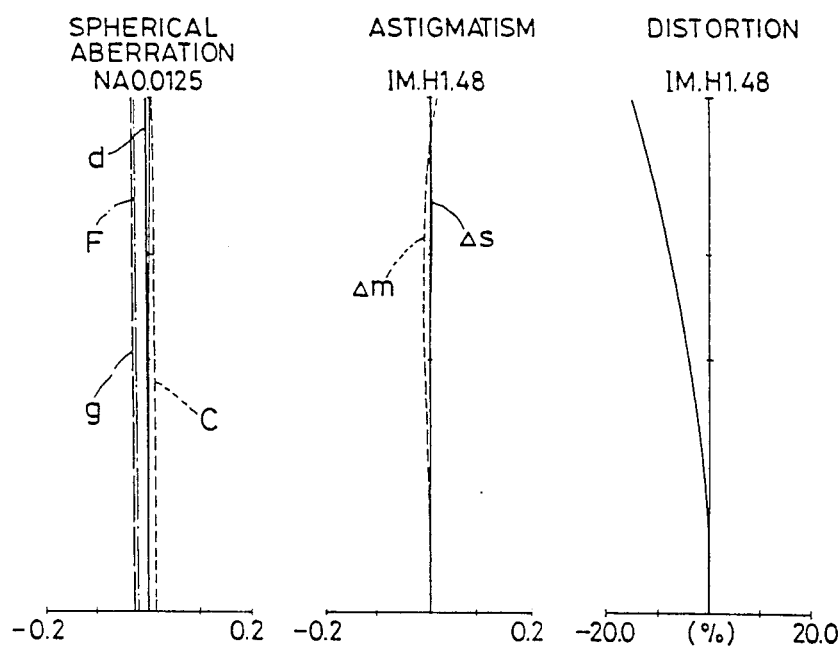
FIGS. 11, 12 and 13 respectively show graphs illustrating aberration curves of said known objective for an endoscope when the object distance is 10.5965, 1.56986 and 1.2755 respectively.
Figure 12:
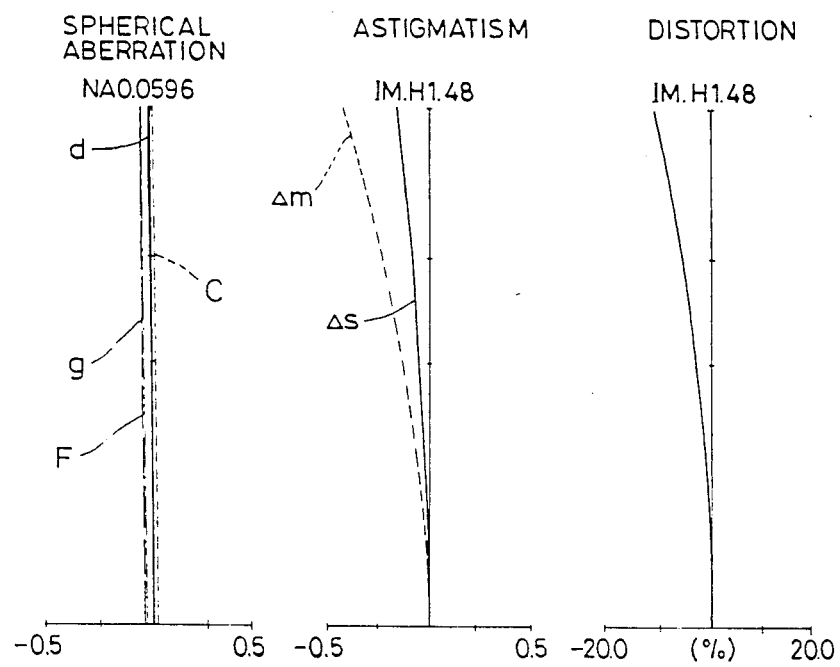
Figure 13:
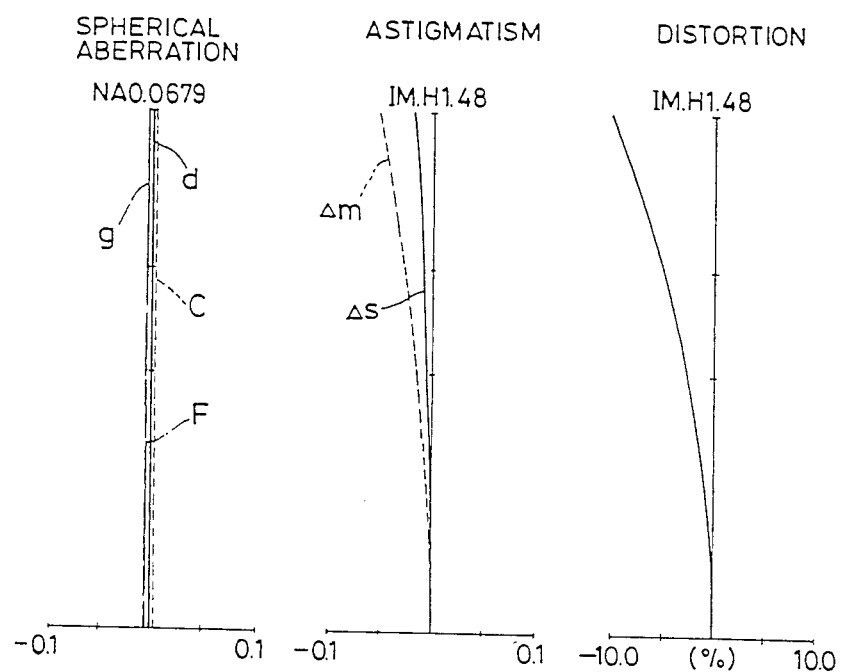

Now, preferred embodiments of the retrofocus-type objective for an endoscope according to the present invention described so far as shown below.

EMBODIMENT 1

$r_1 = 2.6667$
$d_1 = 0.1994$     $n_1 = 1.51633$     $\nu_1 = 64.15$
$r_2 = 0.3493$
$d_2 = 0.4274$
$r_3 = \infty$     (stop)
$d_3 = 0.1083$
$r_4 = -1.0188$
$d_4 = 0.4387$     $n_2 = 1.51633$     $\nu_2 = 64.15$
$r_5 = -0.6439$
$d_5 = 0.1673$     (variable)
$r_6 = 2.9248$
$d_6 = 1.1453$     $n_3 = 1.51633$     $\nu_3 = 64.15$
$r_7 = -2.0177$
$d_7 = 0.1766$
$r_8 = 1.4803$
$d_8 = 1.2137$     $n_4 = 1.51633$     $\nu_4 = 64.15$
$r_9 = -1.0849$
$d_9 = 0.7123$     $n_5 = 1.84666$     $\nu_5 = 23.78$
$r_{10} = 5.3578$
$d_{10} = 0.7729$     (variable)
$r_{11} = 3.6279$
$d_{11} = 0.4217$     $n_6 = 1.51633$     $\nu_6 = 64.15$
$r_{12} = \infty$ $f_a = 1.0$, NA $= -0.00972$, image height $= 0.54986$
$f_1/f_a = -0.8017$, $f_2/f_a = 1.1698$
$D/f_a = 0.5356$, $r_1/f_a = 2.6667$
$r_4/f_a = -1.0188$, R $= 1.89$

| object distance | magnification | $d_5$ | $d_{10}$ |
|---|---|---|---|
| 14.2450 | −0.059 | 0.7123 | 0.2279 |
| 1.5385 | −0.563 | 0.1673 | 0.7729 |

Embodiment 2

$r_1 = 2.8409$
$d_1 = 0.1988$     $n_1 = 1.51633$     $\nu_1 = 64.15$
$r_2 = 0.3615$
$d_2 = 0.4257$
$r_3 = \infty$     (stop)
$d_3 = 0.1705$
$r_4 = -1.0429$
$d_4 = 0.4372$     $n_2 = 1.51633$     $\nu_2 = 64.15$
$r_5 = -0.6563$
$d_5 = 0.1705$     (variable)
$r_6 = 2.4944$
$d_6 = 1.0228$     $n_3 = 1.51633$     $\nu_3 = 64.15$
$r_7 = -2.2139$
$d_7 = 0.1763$
$r_8 = 1.4502$
$d_8 = 1.2104$     $n_4 = 1.51633$     $\nu_4 = 64.15$
$r_9 = -0.9766$
$d_9 = 0.5683$     $n_5 = 1.84666$     $\nu_5 = 23.78$
$r_{10} = 3.6813$
$d_{10} = 0.767$     (variable)
$r_{11} = 2.7899$
$d_{11} = 0.4207$     $n_6 = 1.51633$     $\nu_6 = 64.15$
$r_{12} = \infty$ $f_a = 1.0$, NA $= -0.00985$, image height $= 0.54830$
$f_1/f_a = -0.825$, $f_2/f_a = 1.1045$
$D/f_a = 0.5962$, $r_1/f_a = 1.8409$
$r_4/f_a = -1.0429$, R $= 1.49$

| object distance | magnification | $d_5$ | $d_{10}$ |
|---|---|---|---|
| 14.2045 | −0.058 | 0.7102 | 0.2273 |
| 1.53409 | −0.566 | 0.1705 | 0.7670 |

Embodiment 3

$r_1 = 3.6957$
$d_1 = 0.1989$     $n_1 = 1.51633$     $\nu_1 = 64.15$
$r_2 = 0.3701$
$d_2 = 0.4676$
$r_3 = \infty$     (stop)
$d_3 = 0.1272$
$r_4 = -1.4476$
$d_4 = 0.3888$     $n_2 = 1.51633$     $\nu_2 = 64.15$
$r_5 = -0.6918$
$d_5 = 0.1708$     (variable)
$r_6 = 3.2891$
$d_6 = 0.6936$     $n_3 = 1.51633$     $\nu_3 = 64.15$
$r_7 = -2.0554$
$d_7 = 0.4029$
$r_8 = 1.5486$
$d_8 = 1.2372$     $n_4 = 1.51633$     $\nu_4 = 64.15$
$r_9 = -1.0511$
$d_9 = 0.3899$     $n_5 = 1.84666$     $\nu_5 = 23.78$
$r_{10} = 19.7115$
$d_{10} = 0.7667$     (variable)
$r_{11} = 3.7001$
$d_{11} = 0.6818$     $n_6 = 1.51633$     $\nu_6 = 64.15$
$r_{12} = \infty$ $f_a = 1.0$, NA $= -0.00966$, image height $= 0.54830$
$f_1/f_a = -0.8131$, $f_2/f_a = 1.1386$
$D/f_a = 0.5948$, $r_1/f_a = 3.6959$
$r_4/f_a = -1.4476$, R $= 2.82$

| object distance | magnification | $d_5$ | $d_{10}$ |
|---|---|---|---|
| 14.20454 | −0.060 | 0.7101 | 0.2274 |
| 1.53409 | −0.561 | 0.1708 | 0.7667 |

Embodiment 4

$r_1 = 1.9989$
$d_1 = 0.1714$     $n_1 = 1.51633$     $\nu_1 = 64.15$
$r_2 = 0.3480$
$d_2 = 0.4689$
$r_3 = \infty$     (stop)
$d_3 = 0.1389$
$r_4 = -1.2988$
$d_4 = 0.3433$     $n_2 = 1.6968$     $\nu_2 = 55.52$
$r_5 = -0.6881$
$d_5 = 0.1694$     (variable)
$r_6 = 52.6913$
$d_6 = 0.5319$     $n_3 = 1.6968$     $\nu_3 = 55.52$ -continued

| | | |
|---|---|---|
| $r_7 = -1.8710$ | | |
| $d_7 = 0.2159$ | | |
| $r_8 = 2.3843$ | | |
| $d_8 = 0.9709$ | $n_4 = 1.7130$ | $\nu_4 = 53.84$ |
| $r_9 = -0.8613$ | | |
| $d_9 = 0.4555$ | $n_5 = 1.78472$ | $\nu_5 = 25.71$ |
| $r_{10} = 1.8834$ | | |
| $d_{10} = 0.7814$ | (variable) | |
| $r_{11} = 1.4427$ | | |
| $d_{11} = 0.7476$ | $n_6 = 1.51633$ | $\nu_6 = 64.15$ |
| $r_{12} = \infty$ | | |

$f_a = 1.0$, NA $= -0.00959$, image height $= 0.55682$
$f_1/f_a = -0.8458$, $f_2/f_a = 1.2798$
$D/f_a = 0.6078$, $r_1/f_a = 1.9989$
$r_4/f_a = -1.2988$, R $= 1.82$

| object distance | magnification | $d_5$ | $d_{10}$ |
|---|---|---|---|
| 14.27755 | −0.057 | 0.7377 | 0.2130 |
| 1.54198 | −0.533 | 0.1694 | 0.7813 |

In respective embodiments shown in the above, reference symbols $r_1$ through $r_{12}$ respectively represent radii of curvature of respective lens surfaces, reference symbols $d_1$ through $d_{11}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

All of embodiments shown in the above are arranged to integrally advange the third and fourth lens components so as to make it possible to observe an object at a short distance by enlarging the object. In other words, respective embodiments are arranged that both of ordinary observation of an object at a long distance and observation of an object at a short distance by enlarging the object are performed by varying the airspaces $d_5$ and $d_{10}$ as shown in the numerical data of respective embodiments.

For the purpose of comparison, the numerical data of the objective for an endoscope disclosed in Japanese published examined patent application No. 15005/80 (U.S. Pat. No. 4,059,344) are shown below.

| | | |
|---|---|---|
| $r_1 = 2.7033$ | | |
| $d_1 = 0.2747$ | $n_1 = 1.51633$ | $\nu_1 = 64.15$ |
| $r_2 = 0.5675$ | | |
| $d_2 = 0.9851$ | | |
| $r_3 = \infty$ | (stop) | |
| $d_3 = 0.1688$ | | |
| $r_4 = -2.7559$ | | |
| $d_4 = 0.4710$ | $n_2 = 1.6968$ | $\nu_2 = 55.52$ |
| $r_5 = -1.3991$ | | |
| $d_5 = 0.1682$ | (variable) | |
| $r_6 = 7.7147$ | | |
| $d_6 = 0.4710$ | $n_3 = 1.6968$ | $\nu_3 = 55.52$ |
| $r_7 = -2.2877$ | | |
| $d_7 = 0.0784$ | | |
| $r_8 = 3.0546$ | | |
| $d_8 = 0.7849$ | $n_4 = 1.6968$ | $\nu_4 = 55.52$ |
| $r_9 = -1.1111$ | | |
| $d_9 = 0.2747$ | $n_5 = 1.78472$ | $\nu_5 = 25.71$ |
| $r_{10} = 16.9937$ | | |
| $d_{10} = 1.7760$ | (variable) | |
| $r_{11} = \infty$ | (image surface) | |

| object distance | magnification | $d_5$ | $d_{10}$ |
|---|---|---|---|
| 10.5965 | −0.087 | 0.5616 | 1.3827 |
| 1.56986 | −0.475 | 0.1682 | 1.7760 |
| 1.2755 | −0.563 | 0.0770 | 1.8673 |

In the numerical data shown in the above, the values for the object distance 1.2755 are reference values obtained by converting the numerical data of said known objective into the case of magnification −0.563 which is aimed at by the present invention. The actual numerical data of said known objective are given on the basis of object distances 10.5965 and 1.56986.

Besides, in case of said known objective having the numerical data shown in the above, the values which correspond to respective conditions of the present invention are as shown below.

$f_a = 1$, image height $= 0.58281$
$f_1/f_a = -1.442$, $f_2/f_a = 1.3482$
$D/f_a = 1.144$, $r_1/f_a = 2.6802$
$r_4/f_a = -2.7323$, R $= 5.31$ Said known objective does not satisfy any of the conditions given in the present invention except the condition (4).

As described in datail in the above and as it will be evident from respective embodiments, the retrofocus-type objective for an endoscope according to the present invention is arranged that the magnification at the time of observation of an object at a short distance is higher compared with known objectives for endoscopes and, at the same time, arranged that the resolving power when observing an object at a short distance is favourable and is well balanced with the resolving power at the time of observation of an object at a long distance so that favourable quality of image is obtained in both of the above-mentioned cases of observation.

I claim:

1. A retrofocus-type objective for an endoscope comprising a first lens component comprising a negative lens, a stop, a second lens component comprising a positive meniscus lens arranged to be concave toward the object side, a third lens component comprising a positive lens, a fourth lens component comprising a cemented doublet consisting of a positive lens and a negative lens, and a fifth lens component comprising a positive lens in the order from the object side, said retrofocus-type objective being arranged to be focused by advancing said third lens component and said fourth lens component and, moreover, to fulfill the conditions (1) and (2) shown below:

$$-0.9 < f_1/f_a \quad (1)$$

$$1.0 < f_2/f_a < 1.3 \quad (2)$$

where reference symbol $f_1$ represents the focal length of the first lens component, reference symbol $f_2$ represents the total focal length of the second through the fifth lens components, and reference symbol $f_a$ represents the focal length of the lens system as a whole when focused on an object at a short distance, said objective further satisfying the following conditions:

$$D/f_a < 0.7 \quad (3)$$

where reference symbol D represents the airspace between the first and second lens components,
and further fulfilling the conditions (4), (5) and (6) shown below:

$$1.0 < r_1/f_a < 4.0 \quad (4)$$

$$-1.5 < r_4/f_a < -1.0 \quad (5)$$

$$1.3 < R < 4.0 \quad (6)$$

$$1/R = 1/r_6 + 1/r_{10}$$

where reference symbol $r_1$ represents the radius of curvature of the surface on the object side of the first lens component, reference symbol $r_4$ represents the radius of curvature of the surface on the object side of the second lens component, reference symbol $r_6$ represents the radius of curvature of the surface of the object side of the third lens component, and reference symbol $r_{10}$ represents the radius of curvature of the surface on the image side of the fourth lens component.

2. A retrofocus-type objective for an endoscope according to claim 1 having the following numerical data:

| | | | |
|---|---|---|---|
| $r_1 = 2.6667$ | | | |
| $d_1 = 0.1994$ | $n_1 = 1.51633$ | | $\nu_1 = 64.15$ |
| $r_2 = 0.3493$ | | | |
| $d_2 = 0.4274$ | | | |
| $r_3 = \infty$ | (stop) | | |
| $d_3 = 0.1083$ | | | |
| $r_4 = -1.0188$ | | | |
| $d_4 = 0.4387$ | $n_2 = 1.51633$ | | $\nu_2 = 64.15$ |
| $r_5 = -0.6439$ | | | |
| $d_5 = 0.1673$ | (variable) | | |
| $r_6 = 2.9248$ | | | |
| $d_6 = 1.1453$ | $n_3 = 1.51633$ | | $\nu_3 = 64.15$ |
| $r_7 = -2.0177$ | | | |
| $d_7 = 0.1766$ | | | |
| $r_8 = 1.4803$ | | | |
| $d_8 = 1.2137$ | $n_4 = 1.51633$ | | $\nu_4 = 64.15$ |
| $r_9 = -1.0849$ | | | |
| $d_9 = 0.7123$ | $n_5 = 1.84666$ | | $\nu_5 = 23.78$ |
| $r_{10} = 5.3578$ | | | |
| $d_{10} = 0.7729$ | (variable) | | |
| $r_{11} = 3.6279$ | | | |
| $d_{11} = 0.4217$ | $n_6 = 1.51633$ | | $\nu_6 = 64.15$ |
| $r_{12} = \infty$ | | | |

$f_a = 1.0$, NA $= -0.00972$, image height $= 0.54986$
$f_1/f_a = -0.8017$, $f_2/f_a = 1.1698$
$D/f_a = 0.5356$, $r_1/f_a = 2.6667$
$r_4/f_a = -1.0188$, R $= 1.89$

| object distance | magnification | $d_5$ | $d_{10}$ |
|---|---|---|---|
| 14.2450 | −0.059 | 0.7123 | 0.2279 |
| 1.5385 | −0.563 | 0.1673 | 0.7729 | where, reference symbols $r_1$ through $r_{12}$ respectively represent radii of curvature of respective lens surfaces, reference symbols $d_1$ through $d_{11}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

3. A retrofocus-type objective for an endoscope according to claim 1 having the following numeral data:

| | | | |
|---|---|---|---|
| $r_1 = 2.8409$ | | | |
| $d_1 = 0.1988$ | $n_1 = 1.51633$ | | $\nu_1 = 64.15$ |
| $r_2 = 0.3615$ | | | |
| $d_2 = 0.4257$ | | | |
| $r_3 = \infty$ | (stop) | | |
| $d_3 = 0.1705$ | | | |
| $r_4 = -1.0429$ | | | |
| $d_4 = 0.4372$ | $n_2 = 1.51633$ | | $\nu_2 = 64.15$ |
| $r_5 = -0.6563$ | | | |
| $d_5 = 0.1705$ | (variable) | | |
| $r_6 = 2.4944$ | | | |
| $d_6 = 1.0228$ | $n_3 = 1.51633$ | | $\nu_3 = 64.15$ |
| $r_7 = -2.2139$ | | | |
| $d_7 = 0.1763$ | | | |
| $r_8 = 1.4502$ | | | |
| $d_8 = 1.2104$ | $n_4 = 1.51633$ | | $\nu_4 = 64.15$ |
| $r_9 = -0.9766$ | | | |
| $d_9 = 0.5683$ | $n_5 = 1.84666$ | | $\nu_5 = 23.78$ |
| $r_{10} = 3.6813$ | | | |
| $d_{10} = 0.767$ | (variable) | | |
| $r_{11} = 2.7899$ | | | |
| $d_{11} = 0.4207$ | $n_6 = 1.51633$ | | $\nu_6 = 64.15$ |
| $r_{12} = \infty$ | | | |

$f_a = 1.0$, NA $= -0.00985$, image height $= 0.54830$
$f_1/f_a = -0.825$, $f_2/f_a = 1.1045$
$D/f_a = 0.5962$, $r_1/f_a = 2.8409$
$r_4/f_a = -1.0429$, R $= 1.49$

| object distance | magnification | $d_5$ | $d_{10}$ |
|---|---|---|---|
| 14.2045 | −0.058 | 0.7102 | 0.2273 |
| 1.53409 | −0.566 | 0.1705 | 0.7670 | where, reference symbols $r_1$ through $r_{12}$ respectively represent radii of curvature of respective lens surfaces, reference symbols $d_1$ through $d_{11}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

4. A retrofocus-type objective for an endoscope according to claim 1 having the following numerical data:

| | | | |
|---|---|---|---|
| $r_1 = 3.6957$ | | | |
| $d_1 = 0.1989$ | $n_1 = 1.51633$ | | $\nu_1 = 64.15$ |
| $r_2 = 0.3701$ | | | |
| $d_2 = 0.4676$ | | | |
| $r_3 = \infty$ | (stop) | | |
| $d_3 = 0.1272$ | | | |
| $r_4 = -1.4476$ | | | |
| $d_4 = 0.3888$ | $n_2 = 1.51633$ | | $\nu_2 = 64.15$ |
| $r_5 = -0.6918$ | | | |
| $d_5 = 0.1708$ | (variable) | | |
| $r_6 = 3.2891$ | | | |
| $d_6 = 0.6936$ | $n_3 = 1.51633$ | | $\nu_3 = 64.15$ |
| $r_7 = -2.0554$ | | | |
| $d_7 = 0.4029$ | | | |
| $r_8 = 1.5486$ | | | |
| $d_8 = 1.2372$ | $n_4 = 1.51633$ | | $\nu_4 = 64.15$ |
| $r_9 = -1.0511$ | | | |
| $d_9 = 0.3899$ | $n_5 = 1.84666$ | | $\nu_5 = 23.78$ |
| $r_{10} = 19.7115$ | | | |
| $d_{10} = 0.7667$ | (variable) | | |
| $r_{11} = 3.7001$ | | | |
| $d_{11} = 0.6818$ | $n_6 = 1.51633$ | | $\nu_6 = 64.15$ |
| $r_{12} = \infty$ | | | |

$f_a = 1.0$, NA $= -0.00966$, image height $= 0.54830$
$f_1/f_a = -0.8131$, $f_2/f_a = 1.1386$
$D/f_a = 0.5948$, $r_1/f_a = 3.6959$
$r_4/f_a = -1.4476$, R $= 2.82$

| object distance | magnification | $d_5$ | $d_{10}$ |
|---|---|---|---|
| 14.20454 | −0.060 | 0.7101 | 0.2274 |
| 1.53409 | −0.561 | 0.1708 | 0.7667 | where, reference symbols $r_1$ through $r_{12}$ respectively represent radii of curvature of respective lens surfaces, reference symbols $d_1$ through $d_{11}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's number of respective lenses.

5. A retrofocus-type objective for an endoscope according to claim 1 having the following numerical data:

| | | | |
|---|---|---|---|
| $r_1 = 1.9989$ | | | |
| $d_1 = 0.1714$ | $n_1 = 1.51633$ | $\nu_1 = 64.15$ | |
| $r_2 = 0.3480$ | | | |
| $d_2 = 0.4689$ | | | |
| $r_3 = \infty$ | (stop) | | |
| $d_3 = 0.1389$ | | | |
| $r_4 = -1.2988$ | | | |
| $d_4 = 0.3433$ | $n_2 = 1.6968$ | $\nu_2 = 55.52$ | |
| $r_5 = -0.6881$ | | | |
| $d_5 = 0.1694$ | (variable) | | |
| $r_6 = 52.6913$ | | | |
| $d_6 = 0.5319$ | $n_3 = 1.6968$ | $\nu_3 = 55.52$ | |
| $r_7 = -1.8710$ | | | |
| $d_7 = 0.2159$ | | | |
| $r_8 = 2.3843$ | | | |
| $d_8 = 0.9709$ | $n_4 = 1.7130$ | $\nu_4 = 53.84$ | |
| $r_9 = -0.8613$ | | | |
| $d_9 = 0.4555$ | $n_5 = 1.78472$ | $\nu_5 = 25.71$ | |
| $r_{10} = 1.8834$ | | | |
| $d_{10} = 0.7814$ | (variable) | | |
| $r_{11} = 1.4427$ | | | |
| $d_{11} = 0.7476$ | $n_6 = 1.51633$ | $\nu_6 = 64.15$ | |
| $r_{12} = \infty$ | | | |

$f_a = 1.0$, NA $= -0.00959$, image height $= 0.55682$
$f_1/f_a = -0.8458$, $f_2/f_a = 1.2798$
$D/f_a = 0.6078$, $r_1/f_a = 1.9989$
$r_4/f_a = -1.2988$, R $= 1.82$

| object distance | magnification | $d_5$ | $d_{10}$ |
|---|---|---|---|
| 14.27755 | $-0.057$ | 0.7377 | 0.2130 |
| 1.54198 | $-0.533$ | 0.1694 | 0.7813 | where, reference symbols $r_1$ through $r_{12}$ respectively represent radii of curvature of respective lens surfaces, reference symbols $d_1$ through $d_{11}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

* * * * *